(12) United States Patent
Xiang et al.

(10) Patent No.: US 11,524,901 B2
(45) Date of Patent: Dec. 13, 2022

(54) METHOD FOR EFFICIENTLY SEPARATING MAGNESIUM AND LITHIUM FROM SALT LAKE BRINE AND SIMULTANEOUSLY PREPARING HIGH-PURITY MAGNESIUM OXIDE AND BATTERY-GRADE LITHIUM CARBONATE

(71) Applicant: Beijing University of Chemical Technology, Beijing (CN)

(72) Inventors: Xu Xiang, Beijing (CN); Xue Duan, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 411 days.

(21) Appl. No.: 16/640,997

(22) PCT Filed: Mar. 8, 2019

(86) PCT No.: PCT/CN2019/080002
§ 371 (c)(1),
(2) Date: Feb. 21, 2020

(87) PCT Pub. No.: WO2020/191691
PCT Pub. Date: Oct. 1, 2020

(65) Prior Publication Data
US 2021/0139340 A1 May 13, 2021

(30) Foreign Application Priority Data
Mar. 22, 2019 (CN) .................. 2019102206139.9

(51) Int. Cl.
*C01D 15/08* (2006.01)
*C01F 5/06* (2006.01)
(Continued)

(52) U.S. Cl.
CPC ............. *C01D 15/08* (2013.01); *C01F 5/06* (2013.01); *C01F 5/24* (2013.01); *C01F 17/247* (2020.01);
(Continued)

(58) Field of Classification Search
CPC ..... C01D 15/00; C01D 15/08; C01P 2002/72; C01P 2004/03; C01P 2006/40; C01F 5/24;
(Continued)

(56) References Cited

FOREIGN PATENT DOCUMENTS

| CN | 1335263 A | 2/2002 |
| CN | 102897805 A | 1/2013 |
| CN | 106745102 A * | 5/2017 ............. C01D 15/08 |

OTHER PUBLICATIONS

Liu et al, English machine translation CN 106745102A, pp. 1-11 (Year: 2017).*

(Continued)

*Primary Examiner* — Claire A Norris
(74) *Attorney, Agent, or Firm* — Hamre, Schumann, Mueller & Larson, P.C.

(57) ABSTRACT

This invention provides a method for efficiently separating magnesium and lithium from salt lake brine, and simultaneously preparing high-purity magnesium oxide and battery-grade lithium carbonate. The detailed processing steps are as follows: (1) adding urea into the brine to dissolve, (2) placing the solution into the reactor for hydrothermal reaction, the magnesium ion will precipitate and enter the solid phase; (3) filtering and drying the production to get the magnesium carbonate solid, while the lithium ion remains in the liquid phase; (4) after directly concentration and precipitation, the battery-grade lithium carbonate can be obtained, while the calcination of solid-phase product results in the high-purity magnesium oxide. In this method, urea is (Continued)

used as the precipitant to separate magnesium and lithium in salt lake without introducing any new metal ion, and the brine solution is not diluted. The solid product is white and fluffy powder, which is easy to filter and separate. The extraction rate of lithium is high than 94%, and the purity of MgO obtained by calcination is higher than 99.5%.

9 Claims, 2 Drawing Sheets

(51) Int. Cl.
  C02F 9/00       (2006.01)
  C01F 17/247     (2020.01)
  C01F 5/24       (2006.01)
  C02F 1/00       (2006.01)
  C02F 1/02       (2006.01)
  C02F 1/52       (2006.01)
  C02F 101/10     (2006.01)
  C02F 103/00     (2006.01)

(52) U.S. Cl.
  CPC ............ *C02F 9/00* (2013.01); *C01P 2002/72* (2013.01); *C01P 2004/03* (2013.01); *C01P 2006/40* (2013.01); *C02F 1/001* (2013.01); *C02F 1/02* (2013.01); *C02F 1/5272* (2013.01); *C02F 2101/10* (2013.01); *C02F 2103/007* (2013.01)

(58) Field of Classification Search
  CPC ...... C01F 5/06; C01F 5/08; C01F 1/00; C01F 17/247; C02F 1/001; C02F 1/05; C02F 2101/10; C02F 2103/007
  USPC .................................................. 423/421, 430
  See application file for complete search history.

(56) References Cited

OTHER PUBLICATIONS

Zhao et al., "Extraction of Lithium from Salt Lake Brine", Progress in Chemistry, Published Jul. 24, 2017, 29(7), 13 pages provided; with English Abstract; discussed in Specification.

Ran et al., "Development of Production Technology of lithium resource in China", Guangzhou Chemical Industry,Jul. 2016, 44 (13), 3 pages provided; with English Abstract; discussed in Specification.

Jia et al., "Research Progress of Lithium Recovery from Salt Lake Brines with Membrane Separation Method and Electrochemical-adsorptive Method", Rare Metals and Cemented Carbides, Feb. 2017, 45 (1), 6 pages provided; with English Abstract; discussed in Specification.

Wang et al., "The processing and application of micro to nano structure magnesium based functional materials", Chemical Technology Market, Jan. 2006, 29 (1), 4 pages provided; with English Abstract; discussed in Specification.

International Search Report (with English and Chinese) and Search Report issued in PCT/CN2019/080002, dated Dec. 24, 2019, 11 pages provided.

* cited by examiner

METHOD FOR EFFICIENTLY SEPARATING MAGNESIUM AND LITHIUM FROM SALT LAKE BRINE AND SIMULTANEOUSLY PREPARING HIGH-PURITY MAGNESIUM OXIDE AND BATTERY-GRADE LITHIUM CARBONATE

FIELD OF THE INVENTION

This invention belongs to the technical field of effective utilization of magnesium and lithium resources from salt lake, particularly involves a method for efficiently separating magnesium and lithium from salt lake brine and simultaneously preparing high-purity magnesium oxide and battery-grade lithium carbonate.

BACKGROUND OF THE INVENTION

Lithium is widely used in energy storage batteries, glass ceramics, nuclear industry, aerospace, clinical medicine and other fields, also known as the "energy metal to promote world progress". Lithium mineral in the world can be divided into two types: brine and hard rock. Nearly 80% of lithium resources in China exist in salt lake brine, and thus the extraction of lithium from salt lake brine will become a final trend.

In addition to lithium, salt lakes also contain a variety of other metal resources, such as magnesium, potassium, calcium, and sodium. Magnesium and lithium are located in the diagonal position of the periodic table of elements, which have similar chemical properties, so it is difficult to separate these two metals. Moreover, the higher the ratio of magnesium to lithium is, the more difficult to separate them. The salt lakes in China feature high Mg/Li ratio, and thus the technology of extracting lithium from salt lakes with low Mg/Li ratio abroad is not suitable for the case in China. Therefore, it is a worldwide challenge to extract lithium from salt lakes with high Mg/Li ratio in China and realize the efficient separation of salt lakes. At present, the main methods of extracting lithium resource from salt lake brine include: calcination leaching, solvent extraction, ion sieve adsorption, electrodialysis and precipitation (Zhao Xu, Zhang Qi, Wu Haihong, et al. Extracting lithium from salt lake brine, Chemical Progress [J]. 2017 (7): 796-808). The calcination technology is mature and has been applied to industrial production, but its process is complex. For example, the energy consumption is high in the production process, and equipment corrosion is serious (Ran Jingwen, Liu Xin, Peijun, et al. the production process and status of lithium resource development in China [J]. Guangzhou Chemical Industry, 2016, 44 (13): 4-5). In the process of solvent extraction, the concentration of hydrochloric acid is very high, which seriously corrodes the equipment. In addition, the use of organic solvent will bring environmental pollution and other problems. The ion sieve adsorption method is low cost, pollution-free, and there is no requirement for lithium concentration. However, there are often side reactions in the analyzing process, and the ion sieve is usually in a powdered form, with poor fluidity and permeability, which is difficult to be applied in industry. The long-term use of ion exchange membrane in electrodialysis leads to the membrane pollution, and the high operation cost requires further research (Jia Hang, He Lihua, Xu Wenhua, et al. Research progress of membrane separation method and electrochemical adsorption method for lithium extraction from salt lake [J]. Rare metals and cemented carbide, 2017 (1): 11-16). Most of the countries use the coprecipitation method to extract lithium resource from salt lakes. This method is suitable for the case of salt lakes with low Mg/Li mass ratio. At present, brine resources from Atacama Lake in Chile, Sears Lake and Yinfeng underground brine in the United States all exhibit low Mg/Li ratio, which have been industrialized and utilized. The coprecipitation method usually needs to add precipitants to form metal hydroxides, which will introduce other ions and has strong adsorption on the surface of solid products, so it is difficult to filter and wash.

Magnesium carbonate is an important chemical product, which can be used as filler and reinforcement for rubber products, so as to improve the quality of products. At the same time, because magnesium carbonate has the characteristics of non combustion, light and loose texture, it also serves as a high-temperature resistant and fire insulation material. Magnesium carbonate can also be directly used in the manufacture of magnesium salt, magnesium oxide, fire retardant coating, printing ink, ceramic glass, cosmetics, toothpaste, medicine and pigment. It has also been widely used in the pharmaceutical industry as a medicine for neutralizing stomach acid, treating stomach disease and duodenal ulcer (Wang Xiaoli, Xue Dongfeng, Yan Chenglin. Preparation technology and application of micro/nano-sized magnesium products [J]. Chemical technology market, 2006, 29 (1): 15-19). Carbonate salts of magnesium usually exists in the following forms: hydrated magnesium carbonate, magnesium carbonate and basic magnesium carbonate.

SUMMARY OF THE INVENTION

The invention aims to provide a method for efficiently separating magnesium and lithium from salt lake brine, and simultaneously preparing high-purity magnesium oxide and battery-grade lithium carbonate during extracting lithium. The invention uses urea as a precipitant to selectively precipitate magnesium ion into solid phase through a uniform hydrothermal precipitation method, while lithium ion in brine is not precipitated and still remains in liquid phase, so as to realize high-efficiency separation of magnesium and lithium. At the same time, the method does not introduce other metal ions (such as sodium ion and potassium ion); the brine solution is not diluted; the solid-phase product obtained is white fluffy powder, which is easy to filter, and the separation process is simple; the lithium-ion solution obtained after filtering does not need to be separated again, and can be directly concentrated into lithium-rich solution, and thus the battery-grade lithium carbonate can be prepared by precipitation. Moreover, magnesium carbonate is not easy to adsorb the ions in the solution and is easy to filter, which can avoid the adsorption of lithium ions and improve the extraction rate of lithium ions in the liquid phase.

The invention describes that the method for the efficient separation of magnesium and lithium from salt lake brine is as follows: adding urea into the brine to dissolve; placing the solution into the reactor for hydrothermal reaction, the magnesium ion will precipitate and enter the solid phase; filtering and drying the production to get the magnesium carbonate solid, while the lithium ion remains in the liquid phase, realizing the efficient separation of magnesium and lithium.

The invention describes that the method for efficiently separating magnesium and lithium from salt lake brine and simultaneously preparing high-purity magnesium oxide is as follows: adding urea into the brine to dissolve; placing the solution into the reactor for hydrothermal reaction, the magnesium ion will precipitate and enter the solid phase;

filtering and drying the production to get the magnesium carbonate solid, while the lithium ion remains in the liquid phase, realizing the efficient separation of magnesium and lithium. Finally, the magnesium carbonate solid is calcined to obtain high-purity magnesium oxide.

The invention describes that the method for efficiently separating magnesium and lithium from salt lake brine and simultaneously preparing the battery-grade lithium carbonate is as follows: adding urea into the brine to dissolve; placing the solution into the reactor for hydrothermal reaction, the magnesium ion will precipitate and enter the solid phase; filtering and drying the production to get the magnesium carbonate solid, while the lithium ion remains in the liquid phase; the battery-grade lithium carbonate is obtained by direct concentration and precipitation.

The described specific steps of the method for efficiently separating magnesium lithium from salt lake brine are as follows:

A. Adding urea into salt lake brine to form a solution. The concentration of urea is 1-10 mol $L^{-1}$; the molar concentration ratio of magnesium ion to urea is in the range of 1:2-1:8;

B. Transferring the solution obtained in step A to a stainless steel reactor lined with PTFE, to conduct hydrothermal reaction under 90-150° C. for 8-24 h;

C. At the end of the reaction, the temperature of the reactor is cooled down to room temperature, and then the solid/liquid is separated by decompression filtration to obtain the solid product and the filtrate; the solid product is dried at 40-60° C. for 3-8 hours without washing to obtain the white powdered magnesium carbonate solid; the lithium ion remains in the filtrate to achieve the high-efficiency separation of magnesium and lithium.

The described specific conditions for the calcination of the magnesium carbonate solid to obtain high-purity magnesium oxide are as follows: raising the temperature to 500-1000° C. for 1-8 h in the air atmosphere with rising rate of 1-10° C./min.

The described specific preparation steps of the battery-grade lithium carbonate are as follows: the filtrate is heated and evaporated to a lithium ion concentration of 20-30 g/L; sodium carbonate is added according to the $Li^+/CO_3^{2-}$ molar ratio of 0.5-1.5, and stirred continuously for 30-90 min at 50-100° C.; the solid/liquid is separated by decompression filtration; the solid is washed for 2-5 times by deionized water, and dried at 90-150° C. for 1-5 h to obtain battery-grade lithium carbonate.

The described concentrations of cations in the salt lake brine are: $[Li^+]$=1-20 g/L, $[Mg^{2+}]$=10-100 g/L, $[K^+]$=2-20 g/L, and $[Nal^+]$=1-30 g/L.

The described filling volume of the solution in the reactor in step B does not exceed ⅔ of the total volume of the reactor.

The described magnesium carbonate solid is $Mg_5(CO_3)_4(OH)_2.4H_2O$ or $MgCO_3$, or the mixture of two phases.

The remarkable effect of the invention:

(1) in addition to the separation of magnesium and lithium resources in salt lake brine, high-purity magnesium oxide (purity greater than 99.5%) is prepared to make all magnesium ions in brine precipitate into the solid phase without introducing other metal ions, while lithium ions remain in the liquid phase;

(2) the extraction rate of lithium ion from brine is high (over 94%), the initial brine solution does not need to be diluted, which ensures the high concentration of lithium ion in the filtrate after separation; the final filtrate is concentrated and precipitated to obtain battery-grade lithium carbonate (purity>99.5%);

(3) the solid product after the reaction is a loose powder solid, which is not easy to adsorb the lithium ion. The solid/liquid phase is easier to separate and the operation process is simple.

DETAILED DESCRIPTION OF EMBODIMENTS

Example 1

A. Weighting 300 mL of salt lake brine, in which the specific concentrations of metal ions are $[Li^+]$=2.25 g/L, $[Mg^{2+}]$=28.49 g/L, $[K^+]$=2.56 g/L, and $[Na^+]$=3.47 g/L respectively; the mass ratio of magnesium to lithium is 12.67; adding 42.234 g of urea to prepare the solution.

B. Transferring the solution obtained in step A to a stainless steel reactor lined with PTFE (500 mL), to conduct hydrothermal reaction at 120° C. for 12 h;

C. At the end of the reaction, the temperature of the reactor is cooled down to room temperature, and then the solid/liquid is separated by decompression filtration to obtain the solid product and the filtrate; the solid product is dried at 60° C. for 4 hours to obtain the white powdered magnesium carbonate solids ($Mg_5(CO_3)_4(OH)_2.4H_2O$ and $Mg CO_3$).

Calcination of the solid product obtained in step C: raising the temperature to 600° C. for 2 h in the air atmosphere with rising rate of 10° C./min. A high purity magnesium oxide product is obtained. The molecular formula is MgO, and the purity is more than 99.5%.

The filtrate obtained in step C is heated and evaporated to a lithium ion concentration of 22 g/L; adding the sodium carbonate into the filtrate according to the $Li^+/CO_3^{2-}$ mole ratio of 0.8, and stirring at 70° C. for 60 min; the solid-liquid is separated by decompression filtration, washed by deionized water for 5 times, dried at 100° C. for 2 h to obtain battery-grade lithium carbonate with the purity of 99.70%.

Example 2

A. Weighting 300 mL of salt lake brine, in which the specific concentrations of metal ions are $[Li^+]$=2.25 g/L, $[Mg^{2+}]$=28.49 g/L, $[K^+]$=2.56 g/L, and $[Na^+]$=3.47 g/L respectively; the mass ratio of magnesium to lithium is 12.67; adding 84.468 g of urea to prepare the solution.

Figure 1:
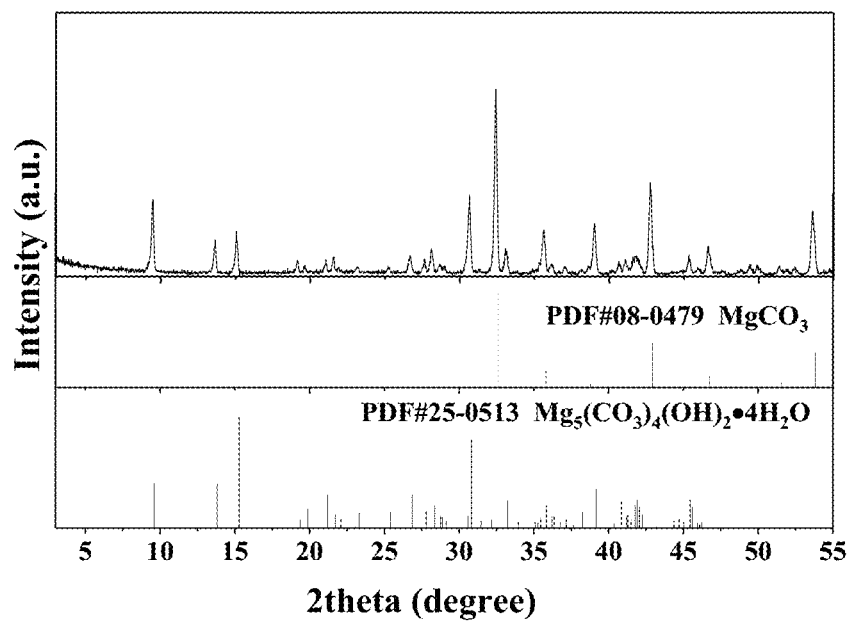
FIG. 1 is the XRD spectrum of the solid phase product in example 2.

B. Transferring the solution obtained in step A to a stainless steel reactor lined with PTFE (500 mL), to conduct hydrothermal reaction at 120° C. for 12 h;

C. At the end of the reaction, the temperature of the reactor is cooled down to room temperature, and then the solid/liquid is separated by decompression filtration to obtain the solid product and the filtrate; the solid product is dried at 60° C. for 4 hours to obtain the white powdered magnesium carbonate solid. The solid-phase products obtained by the reaction are irregular lamellar structure with the size ranging from 0.1 μm to 60 μm. The XRD characterization results show that they are a mixture of $Mg_5(CO_3)_4(OH)_2 \cdot 4H_2O$ and $MgCO_3$. The phase and morphology characterization of the solid-phase products are shown in FIG. 1.

Figure 2:
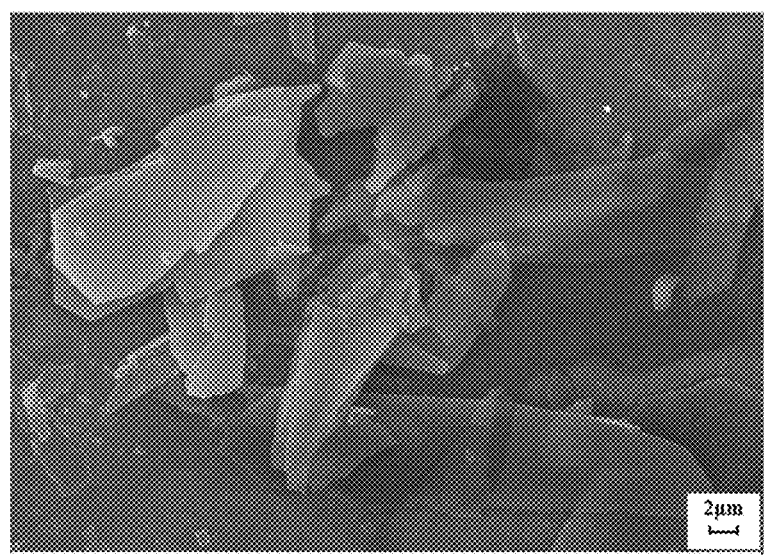
FIG. 2 is the SEM image of the solid phase product in example 2.
Figure 3:
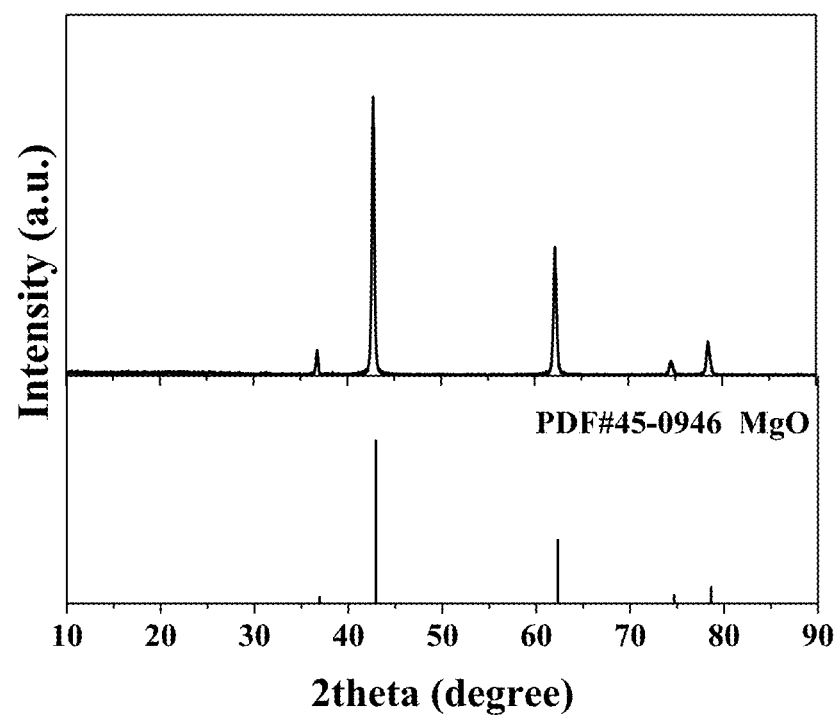
FIG. 3 is the XRD spectrum of MgO obtained in example 2.

Calcination of the solid product obtained in step C: raising the temperature to 600° C. for 2 h in the air atmosphere with rising rate of 10° C./min. A high purity magnesium oxide product is obtained. The molecular formula is MgO, and the purity is more than 99.5%. The XRD characterization of solid-phase is shown in FIG. 2.

The filtrate obtained in step C is heated and evaporated to a lithium ion concentration of 24 g/L; adding the sodium carbonate into the filtrate according to the $Li^+/CO_3^{2+}$ mole ratio of 0.8, and stirring at 80° C. for 60 min; the solid-liquid is separated by decompression filtration, washed by deionized water for 5 times, dried at 100° C. for 2 h to obtain battery-grade lithium carbonate with the purity of 99.85%.

Example 3

A. Weighting 300 mL of salt lake brine, in which the specific concentrations of metal ions are $[Li^+]$=2.25 g/L, $[Mg^{2+}]$=28.49 g/L, $[K^+]$=2.56 g/L, and $[Na^+]$=3.47 g/L respectively; the mass ratio of magnesium to lithium is 12.67; adding 126.702 g of urea to prepare the solution.

B. Transferring the solution obtained in step A to a stainless steel reactor lined with PTFE (500 mL), to conduct hydrothermal reaction at 120° C. for 12 h;

C. At the end of the reaction, the temperature of the reactor is cooled down to room temperature, and then the solid/liquid is separated by decompression filtration to obtain the solid product and the filtrate; the solid product is dried at 60° C. for 4 hours to obtain the white powdered magnesium carbonate solids ($Mg_5(CO_3)_4(OH)_2 \cdot 4H_2O$ and $Mg CO_3$).

Calcination of the solid product obtained in step C: raising the temperature to 600° C. for 2 h in the air atmosphere with rising rate of 10° C./min. A high purity magnesium oxide product is obtained. The molecular formula is MgO, and the purity is more than 99.5%.

The filtrate obtained in step C is heated and evaporated to a lithium ion concentration of 26 g/L; adding the sodium carbonate into the filtrate according to the $Li^+/CO_3^{2+}$ mole ratio of 1, and stirring at 90° C. for 60 min; the solid-liquid is separated by decompression filtration, washed by deionized water for 5 times, dried at 100° C. for 2 h to obtain battery-grade lithium carbonate with the purity of 99.65%.

Example 4

A. Weighting 300 mL of salt lake brine, in which the specific concentrations of metal ions are $[Li^+]$=2.25 g/L, $[Mg^{2+}]$=28.49 g/L, $[K^+]$=2.56 g/L, and $[Na^+]$=3.47 g/L respectively; the mass ratio of magnesium to lithium is 12.67; adding 168.936 g of urea to prepare the solution.

B. Transferring the solution obtained in step A to a stainless steel reactor lined with PTFE (500 mL), to conduct hydrothermal reaction at 120° C. for 12 h;

C. At the end of the reaction, the temperature of the reactor is cooled down to room temperature, and then the solid/liquid is separated by decompression filtration to obtain the solid product and the filtrate; the solid product is dried at 60° C. for 4 hours to obtain the white powdered magnesium carbonate solids ($Mg_5(CO_3)_4(OH)_2 \cdot 4H_2O$ and $Mg CO_3$).

Calcination of the solid product obtained in step C: raising the temperature to 600° C. for 2 h in the air atmosphere with rising rate of 10° C./min. A high purity magnesium oxide product is obtained. The molecular formula is MgO, and the purity is more than 99.5%.

The filtrate obtained in step C is heated and evaporated, concentrated to a lithium ion concentration of 28 g/L; adding the sodium carbonate into the filtrate according to the $Li^+/CO_3^{2+}$ mole ratio of 1, and stirring at 100° C. for 60 min; the solid-liquid is separated by decompression filtration, washed by deionized water for 5 times, dried at 100° C. for 2 h to obtain battery-grade lithium carbonate with the purity of 99.68%.

The salt lake brine used in the above examples belongs to chloride ion type, and the composition of each ion is shown in Table 1.

TABLE 1

| the concentration values of ions in the salt lake brine | | | | | | |
|---|---|---|---|---|---|---|
| Ions | $Mg^{2+}$ | $Li^+$ | $K^+$ | $Na^+$ | $Cl^-$ | $SO_4^{2-}$ |
| Concentration (g/L) | 10~100 | 1~20 | 2~20 | 1~30 | 100~260 | 10~60 |

The invention claimed is:

1. A method for the efficient separation of magnesium and lithium from salt lake brine, comprising: adding urea into the brine to dissolve to obtain a solution; placing the solution into a reactor for hydrothermal reaction to obtain a product, so that magnesium ions will precipitate and enter a solid phase; filtering and drying the product to get a magnesium carbonate solid, while lithium ions remain in a liquid phase, so that separation of magnesium and lithium is realized.

2. The method according to claim 1 wherein
   the step of adding urea into the brine to dissolve to obtain a solution comprises: adding urea into the brine to form a solution, the molar concentration ratio of magnesium ions to urea being,
   the step of placing the solution into a reactor for hydrothermal reaction comprises: transferring the solution obtained to the reactor, the reactor made of stainless steel and lined with polytetrafluoroethylene (PTFE), and conducting the hydrothermal reaction under 90-150° C. for 8-24 h, and
   the step of filtering and drying the product comprises: at the end of the hydrothermal reaction, cooling down a temperature of the reactor to room temperature, and then conducting decompression filtration to achieve solid-liquid separation to obtain a solid product and a filtrate, and drying the solid product at 40-60° C. for 3-8 hours without washing to obtain a white powdered magnesium carbonate solid, the lithium ions remaining in the filtrate so that separation of magnesium and lithium is achieved.

3. The method according to claim 2 wherein concentrations of cations within the brine are: $[Li^+]$=1-20 g/L, $[Mg^{2+}]$=10-100 g/L, $[K^+]$=2-20 g/L, and $[Nal^+]$=1–30 g/L.

4. The method according to claim 2, wherein a filling volume of the solution in the reactor does not exceed ⅔ of a total volume of the reactor.

5. The method according to claim 2, wherein the white powdered magnesium carbonate solid is $Mg_5(CO_3)_4(OH)_2 \cdot 4H_2O$, $MgCO_3$, or a mixture of $Mg_5(CO_3)_4(OH)_2 \cdot 4H_2O$ and $MgCO_3$.

6. A method for efficiently separating magnesium and lithium from salt lake brine and simultaneously preparing high-purity magnesium oxide, comprising: adding urea into the brine to dissolve to obtain a solution;

placing the solution into a reactor for hydrothermal reaction to obtain a product, so that magnesium ions will precipitate and enter a solid phase; filtering and drying the product to get a magnesium carbonate solid, while lithium ions remain in a liquid phase, so that separation of magnesium and lithium is realized, and calcining the magnesium carbonate solid to obtain high-purity magnesium oxide.

7. The method according to claim 6 wherein the step of calcining the magnesium carbonate solid comprises: raising a calcining temperature to 500-1000° C. for 1-8 h in air atmosphere with a rising rate of 1-10° C./min.

8. A method for efficiently separating magnesium and lithium from salt lake brine and simultaneously preparing a battery-grade lithium carbonate, comprising: adding urea into the brine to dissolve to obtain a solution;

placing the solution into a reactor for hydrothermal reaction to obtain a product, so that magnesium ions will precipitate and enter a solid phase; filtering and drying the product to get a magnesium carbonate solid, while lithium ions remain in a liquid phase; and concentrating and precipitating the liquid phase to obtain the battery-grade lithium carbonate.

9. The method according to claim 8 wherein the step of concentrating and precipitating the liquid phase to obtain the battery-grade lithium carbonate comprises: heating and evaporating the liquid phase to achieve a lithium ion concentration of 20-30 g/L;

adding sodium carbonate according to the $Li^+/CO_3^{2-}$ molar ratio of 0.5-1.5, and stirring continuously for 30-90 min at 50-100° C.; conducting decompression filtration to achieve solid-liquid separation and washing a solid obtained after the solid-liquid separation for 2-5 times by deionized water, and drying the solid at 90-150° C. for 1-5 h to obtain the battery-grade lithium carbonate.

* * * * *